May 15, 1923.

R. M. WOODS 1,455,418

ICE CREAM FREEZER

Filed July 7, 1922

Inventor
R. M. Woods.
By N. E. Dunlap,
Attorney

Patented May 15, 1923.

1,455,418

UNITED STATES PATENT OFFICE.

ROBERT M. WOODS, OF WHEELING, WEST VIRGINIA.

ICE-CREAM FREEZER.

Application filed July 7, 1922. Serial No. 573,406.

*To all whom it may concern:*

Be it known that I, ROBERT M. WOODS, a citizen of the United States of America, and resident of Wheeling, county of Ohio, and State of West Virginia, have invented certain new and useful Improvements in Ice-Cream Freezers, of which the following is a specification.

This invention relates broadly to motor actuated stirring and beating mechanisms, and more specifically to an agitator device whereby fluids or semi-fluids may be stirred or beaten.

The principal object of the invention is to provide a motor driven mechanism, primarily designed as an ice-cream freezer, whereby the material acted upon is rapidly agitated for effecting the freezing thereof.

A further object is to provide an apparatus which is simple in construction, and efficient in operation and which involves but few parts liable to become out of order.

A still further object is to provide a motor adapted for attachment to an ordinary water faucet and to be actuated by the pressure of water issuing from such faucet for driving an ice-cream freezer or other small domestic stirring or beating mechanisms.

With these and other objects in view, the invention resides in the features of construction, arrangement of parts and combinations of elements which will hereinafter be fully described, reference being had to the accompanying drawings, in which—

Figure 1:
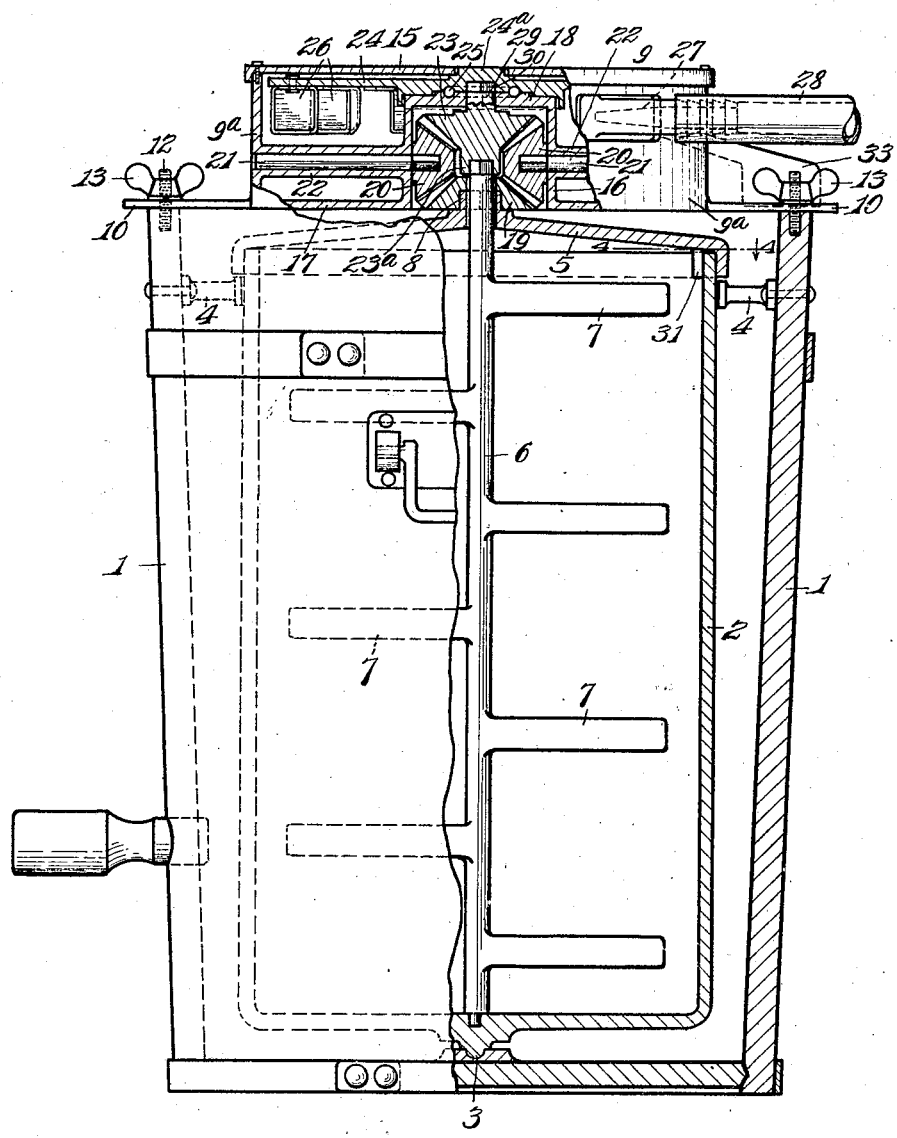
Figure 1 is a view of the invention partly in side elevation and partly in central vertical section.
Figure 2:
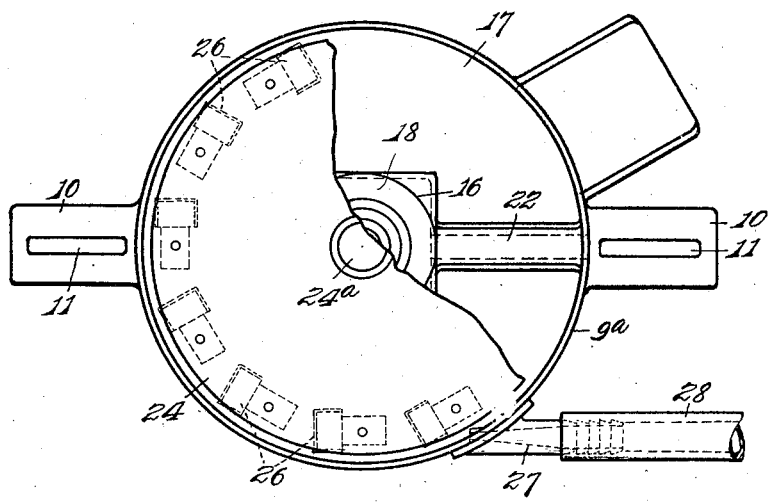
Figure 2 is a partial top plan view of the motor with its cover removed and showing a portion of the rotor disk broken away.
Figure 3:
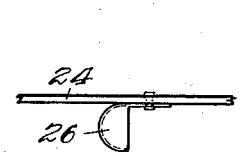
Figure 3 is a side elevation of one of the buckets of the rotor; and—
Figure 4:
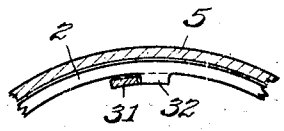
Figure 4 is a horizontal sectional detail on the line 4—4, Fig. 1.

Referring to said drawings, 1 indicates an outer receptacle, herein shown in the form of an ice-cream freezer pail, and 2 designates an inner receptacle or can which constitutes a container for the material to be acted upon. Said can 2 has formed centrally upon its bottom a pivot-like projection 3 which is received for rotation in a socket provided therefor in the bottom of the pail 1. Suitable braces 4 carried interiorly of said pail more or less loosely engage the walls of the can adjacent to the upper end of the latter for maintaining it in substantially upright position.

Seated upon the top of the can 2 is a cover 5, and located within said can is a central vertical shaft 6 which carries a plurality of suitably arranged stirrers 7 in the form of paddles or blades. The lower end of said shaft is pivotally seated for rotation on the bottom of the can, while the upper end portion of the shaft projects through and is rotatable with respect to a central upright neck 8 formed on the cover 5.

Superposed centrally over the can 2 is a motor, generally designated by the numeral 9, comprising a cylindrical casing $9^a$ having diametrically opposite arms 10 arranged for seating upon the top of the pail, slots 11 in said arms being adapted to receive therein screws 12, and wing nuts 13 being provided for adjustment on said screws for firmly holding said arms in properly seated positions on the pail. The motor casing $9^a$ has a detachable top-plate or cover 15. Located interiorly of the casing in a central position is a cylindrical housing 16 which is open at its lower end and which has its said end connected to the corresponding end of the encircling casing by a horizontal web or wall 17 which forms the bottom of said casing, said casing with its said bottom 17 and the housing 16 being preferably formed integral, or in a single casting. The upper end of the housing 16 is closed by an integral horizontal top 18 which is located at a spaced distance from the casing cover 15.

The neck 8 of the can cover 5 is of externally squared form, and removably mounted in close fitting relation thereto is an upwardly facing bevel gear 19. Disposed in mesh with said gear 19 are two similar gears 20 carried by a pair of horizontally alined spindles 21 which are rotatable in bearings constituted by radially disposed arms 22 which are formed integral with the casing and which extend from the casing wall $9^a$ to the housing 16 above the level of the bottom 17. The oppositely facing bevel gears 20 also have in mesh therewith a downwardly facing bevel gear 23 which has a central stem portion $23^a$ extending downward between the opposite gears 20. Said stem portion $23^a$ has therein a squared pocket in which is received the correspondingly shaped upper end of the shaft 6. Said bevel gear also carries a central upright stem 29 which extends through and is rotatable in the top 18 of the housing 16.

Disposed between the casing cover 15 and the top 18 of the housing 16 and mounted for rotation on the latter is a disk 24 which has a central hub portion 24ᵃ projected through and rotatable in the casing cover 15. Ball bearings 25 interposed between said disk 24 and the housing top 18 facilitate rotation of the former with respect to the latter. Suitable buckets 26 carried in suitably spaced relation on the under face of said disk are arranged to successively receive the impact of a jet of water introduced within the casing through a suitably located nozzle 27, whereby said disk is impelled to rotate, said disk and buckets together constituting a rotor. Said nozzle has attached thereto a water conducting tube 28, which may be in the form of a flexible hose adapted to be attached to a faucet of an ordinary water service line.

A squared socket provided centrally in the under side of the rotor disk 24 has snugly received therein the projecting squared end 30 of the stem 29 of the bevel gear 23. Thus, rotation imparted to the rotor by the water introduced through the nozzle 27 is communicated directly through the bevel gear 23 to the stirrer shaft 6 which, as hereinbefore stated, is operatively engaged with the stem 23ᵃ of said gear. At the same time, rotation in a direction reverse to that of the shaft 6 is imparted to the can cover 15 through said gear 23, the idle gears 20 and the upwardly facing gear 19, the last mentioned gear, as hereinbefore stated, being operatively engaged with the neck 8 of said cover. Said cover carries on its under side a downwardly extending lug 31 which is adapted to abut against a lug 32 formed interiorly of the upper edge portion of the can 2, thereby to effect interlocking of said can with its cover. Consequently, said can is rotated in a direction reverse to that of the paddles or blades 7 carried by the shaft 6, whereby with a greatly reduced motor speed an equally high relative rotative speed between the can and the stirrer may be attained.

The water utilized in imparting rotation to the parts falls to the bottom of the motor casing and drains therefrom through a suitably located side-opening spout 33.

It will be noted that access to the interior of the motor for cleaning or for repairs may be readily had through removal of the cover 15; also, that the various parts of the mechanism may be readily assembled and disassembled as occasion may require by practically any person possessing ordinary or average mechanical skill.

What is claimed is—

1. In a device of the character described, a container having a cover, a stirrer rotatable within said container and having its upper end projected above said cover, and a motor for driving said stirrer, said motor being superposed over said container and comprising a casing having a bottom and provided with a detachable cover, a housing located centrally with respect to said casing, said housing having its upper end closed, a water actuated rotor above said end of said housing, and means intermediate said rotor and the projecting end of said stirrer whereby rotation of the former is imparted to the latter.

2. In a device of the character described, a container having a cover adapted to interlock therewith, a stirrer rotatable within said container and having its upper end projected above said cover, and a motor superposed over said container, said motor comprising a casing having a closed top and bottom, a central upright housing within said casing, said housing having its upper end closed and its lower end open, a water-actuated rotor mounted for rotation upon the top of said housing, a downwardly facing bevel gear located within said housing, said gear having a stem projected through and rotatable in the upper end of said housing and interengaged with said rotor, said gear being mounted in driving relation to the projecting end of said stirrer, a bevel gear carried by and in non-rotating relation to said container cover, and an idle gear interposed between said shaft-carried and cover-carried gears.

3. An ice-cream freezer comprising a pail, a can rotatably mounted within said pail, means maintaining said can in centered upright position, a cover for said can adapted to interlock with the latter, a stirrer shaft mounted for rotation within said can and projecting centrally through and rotatable with respect to said cover, a water actuated motor mounted upon said pail in overlying relation to said can cover, a downwardly facing bevel gear seated in driving relation to the projecting end of said stirrer shaft, said gear being interengaged with a rotating member of said motor whereby it is driven, and gearing interposed between said bevel gear and the pail cover whereby the latter is rotated in a direction reverse to that of said shaft.

4. An ice-cream freezer comprising a pail, a can rotatably mounted within said pail, means maintaining said can in centered upright position, a cover for said can adapted to interlock with the latter, a stirrer shaft mounted for rotation within said can and projecting centrally through and rotatable with respect to said cover, a motor casing mounted upon said pail in overlying relation to said can cover, a housing located centrally within said casing and having a closed upper end, a water actuated rotor mounted for rotation on said upper end of the housing, a downwardly facing gear within said housing interengaged with the projecting upper end of said stirrer shaft and having a portion directed through said upper end of the housing into interengaging relation to said rotor, whereby rotation is imparted from said rotor through said gear to said shaft, an upwardly facing gear non-rotatably engaged with said can cover, and idle gears intermediate the downwardly facing gear and the upwardly facing gear whereby reverse rotation is imparted to the latter for rotating the can.

5. In an ice-cream freezer, a container, a cover adapted to be interlocked with said container, a stirrer rotatable within said container, said stirrer including a shaft having its upper end projecting through and rotatable in said cover, and a motor whereby said shaft and said container are rotated in reverse directions, said motor comprising a cylindrical casing adapted for mounting over said container and having upper and lower closed ends, a housing located centrally within said casing, said housing having a closed upper end and an open lower end, said upper end being spaced from the upper end of the casing, a water-actuated rotor mounted between said upper end of the housing and the upper end of the casing, a downwardly facing bevel gear located within the housing and driven by said rotor, said gear having a lower stem portion disposed in driving relation to said shaft, an upwardly-facing gear located in non-rotating relation to the container cover, and gearing interposed between and operatively associated with said gears whereby the upwardly-facing gear is actuated for rotating the container in a direction reverse to that of the downwardly-facing gear.

6. An ice-cream freezer comprising a pail, a can rotatably mounted within said pail, a cover for said can adapted to interlock with the latter, said cover having an upright neck of externally squared form, a stirrer shaft mounted for rotation within said can and projecting centrally through and rotatable with respect to said cover, a water actuated motor mounted upon said pail in overlying relation to said can cover, a gear interposed between said motor and said shaft through which rotation is imparted directly from the former to the latter, a gear removably seated upon said squared neck of the cover, gearing interposed between said shaft-rotating gear and said removably seated gear whereby reverse rotation is imparted to the latter, and means enclosing the gears whereby the latter are housed in an isolated position with respect to said motor.

In testimony whereof, I affix my signature in presence of two subscribing witnesses.

ROBERT M. WOODS.

Witnesses:
M. T. MANION,
H. E. DUNLAP.